J. H. SHOEMAKER & H. BRUCK.
SHOE TAP OR HALF SOLE.
APPLICATION FILED APR. 17, 1917.

1,239,628.  Patented Sept. 11, 1917.

J. H. Shoemaker
H. Bruck  AND
Inventors

UNITED STATES PATENT OFFICE.

JOHN H. SHOEMAKER AND HENRY BRUCK, OF PORTLAND, OREGON.

SHOE TAP OR HALF-SOLE.

1,239,628.

Specification of Letters Patent.

Patented Sept. 11, 1917.

Application filed April 17, 1917. Serial No. 162,616.

*To all whom it may concern:*

Be it known that we, JOHN H. SHOEMAKER and HENRY BRUCK, citizens of the United States, residing at Portland, in the county of Multnomah, State of Oregon, have invented a new and useful Shoe Tap or Half-Sole, of which the following is a specification.

This invention relates to shoe taps or half soles formed of compositions of matter, one of the objects of the invention being to provide means whereby the back edge of a tap or half sole can be securely attached to the shank portion of the shoe without danger of the attaching means pulling out of the tap.

Heretofore, where composition half soles or taps have been used, considerable difficulty has been experienced in so fastening the back edge to the shank of the shoe as to prevent the edge from pulling away from the shank, this being due to the fact that the bending action of the sole causes the composition tap to pull off of the heads of the nails used in fastening the tap to the shank.

One of the objects of the present invention is to so construct the tap or half sole that it will not pull off of the nails or other fastening means used along the rear edge thereof, but will be as securely held as the ordinary leather half sole.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown. In said drawings:—

Figure 1:
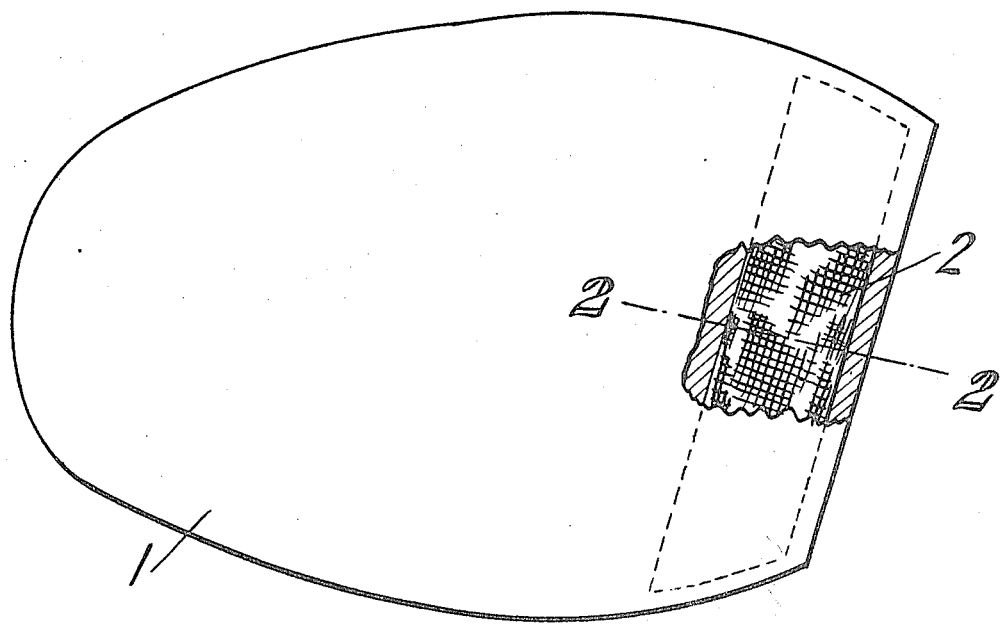
Figure 1 is a plan view of a tap or half sole having the present improvements combined therewith, a portion of the composition being broken away to show the insert.
Figure 2:
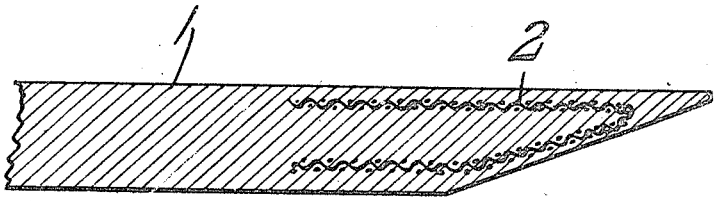
Fig. 2 is a section on line 2—2 Fig. 1.

Referring to the figures by characters of reference 1 designates a half sole or tap formed of rubber or any other suitable composition. Arranged within the back edge portion of this tap or half sole is a strip of fabric indicated at 2 and which is folded along its longitudinal center so as to provide two plies both of which are embedded in the tap, the fold being located close to the rear edge as shown particularly in Fig. 2.

In making the tap with the present improvements, the fabric strip, which can be canvas or the like, is folded and placed in the back portion of the tap before the same is vulcanized. After the tap has been vulcanized, this fabric will be securely embedded therein and will constitute an efficient reinforcing means which, when engaged by nails driven therethrough, will cling tightly to the nails and prevent the tap from pulling off of them. Thus the tap will be held as securely as an ordinary leather tap where attached to the shank of the shoe.

What is claimed is:—

1. A shoe tap having upper and lower thicknesses of fibrous, reinforcing material embedded in the rear edge portion thereof, said thicknesses being separated from each other so as not to form a double thickness.

2. A shoe tap including a composition body and a fabric strip extending throughout the width of the body at the back edge thereof, said strip being completely housed within the tap, and being folded longitudinally to form spaced plies.

3. A shoe tap including a composition body and a fabric strip extending throughout the width of the body at the back edge thereof, said strip being completely housed within the tap and being folded longitudinally, the fold portion of the fabric being located close to the rear edge of the tap.

4. A shoe tap consisting of a vulcanized composition and a longitudinally folded fabric strip housed in the composition close to the back edge of the tap, the fold of the fabric being located adjacent said edge.

In testimony that we claim the foregoing as our own, we have hereto affixed our signatures in the presence of two witnesses.

JOHN H. SHOEMAKER.
HENRY BRUCK.

Witnesses:
C. THURKELSON,
JOHN W. REYNOLDS.